(12) United States Patent
Wessel et al.

(10) Patent No.: US 12,307,775 B2
(45) Date of Patent: May 20, 2025

(54) SYSTEM FOR MONITORING THE OPERATION OF A SHIP

(71) Applicant: MARITIME ADVANCED VIDEO TECHNOLOGY, Kiel (DE)

(72) Inventors: Michael Wessel, Kiel (DE); Hinrich Kahl, Kiel (DE); Markus Werner, Kiel (DE); Oliver Welzel, Kiel (DE); Karsten Wurm, Kiel (DE)

(73) Assignee: MARITIME ADVANCED VIDEO TECHNOLOGY, Kiel (DE)

( * ) Notice: Subject to any disclaimer, the term of this patent is extended or adjusted under 35 U.S.C. 154(b) by 0 days.

(21) Appl. No.: 18/015,163

(22) PCT Filed: Jul. 1, 2021

(86) PCT No.: PCT/DE2021/100565
§ 371 (c)(1),
(2) Date: Jan. 9, 2023

(87) PCT Pub. No.: WO2022/007997
PCT Pub. Date: Jan. 13, 2022

(65) Prior Publication Data
US 2023/0252788 A1 Aug. 10, 2023

(30) Foreign Application Priority Data

Jul. 10, 2020 (DE) .......................... 102020118303.8

(51) Int. Cl.
*G06V 20/52* (2022.01)
*G01S 13/86* (2006.01)
(Continued)

(52) U.S. Cl.
CPC .............. *G06V 20/52* (2022.01); *G01S 13/86* (2013.01); *G06F 3/017* (2013.01); *G06V 40/174* (2022.01); *B63B 2035/004* (2013.01)

(58) Field of Classification Search
CPC .. B63B 2035/004; G06V 10/95; G06V 20/52; G06V 40/174; G11B 5/5582
See application file for complete search history.

(56) References Cited

U.S. PATENT DOCUMENTS

| | | | | |
|---|---|---|---|---|
| 2002/0184119 | A1* | 12/2002 | Gagne | G06Q 10/087 705/29 |
| 2004/0243859 | A1* | 12/2004 | Mueller | B63H 21/22 713/300 |
| 2019/0336059 | A1* | 11/2019 | Takemoto | A61B 5/18 |

FOREIGN PATENT DOCUMENTS

| | | | | |
|---|---|---|---|---|
| CN | 102565574 B | * | 10/2014 | |
| CN | 110320886 A | * | 10/2019 | ......... G05B 23/0213 |

(Continued)

*Primary Examiner* — Md N Haque
(74) *Attorney, Agent, or Firm* — Jordan IP Law, LLC

(57) ABSTRACT

The invention relates to a system for monitoring the operation of a ship comprising a plurality of sensors, which are designed to monitor equipment of the ship and/or people and objects on board the ship, a central computer connected to the sensors in a communicating manner, and a plurality of reporting units connected to the central computer in a communicating manner, wherein the reporting units are grouped in a plurality of reporting groups, corresponding to organisational units for operationally and nautically controlling the ship, and the central computer is designed for informing a reporting unit associated with a predetermined reporting group according to an event detected by at least one sensor, characterised in that at least one of the sensors is a video camera, a LIDAR and/or a radar system, wherein at least one of the sensors or the central computer is designed for face, gesture and/or facial expression recognition and the detected event is a face, gesture and/or a facial expression.

11 Claims, 1 Drawing Sheet

(51) Int. Cl.
    *G06F 3/01*         (2006.01)
    *G06V 40/16*      (2022.01)
    *B63B 35/00*      (2020.01)

(56) References Cited

FOREIGN PATENT DOCUMENTS

| | | | | |
|---|---|---|---|---|
| DE | 19636853 | 1/1996 | | |
| DE | 4423233 | 3/1998 | | |
| DE | 19636853 A1 * | 3/1998 | ............. | B63B 43/00 |
| WO | 2004106153 | 12/2004 | | |
| WO | WO-2004106153 A1 * | 12/2004 | ............. | B63B 49/00 |

* cited by examiner

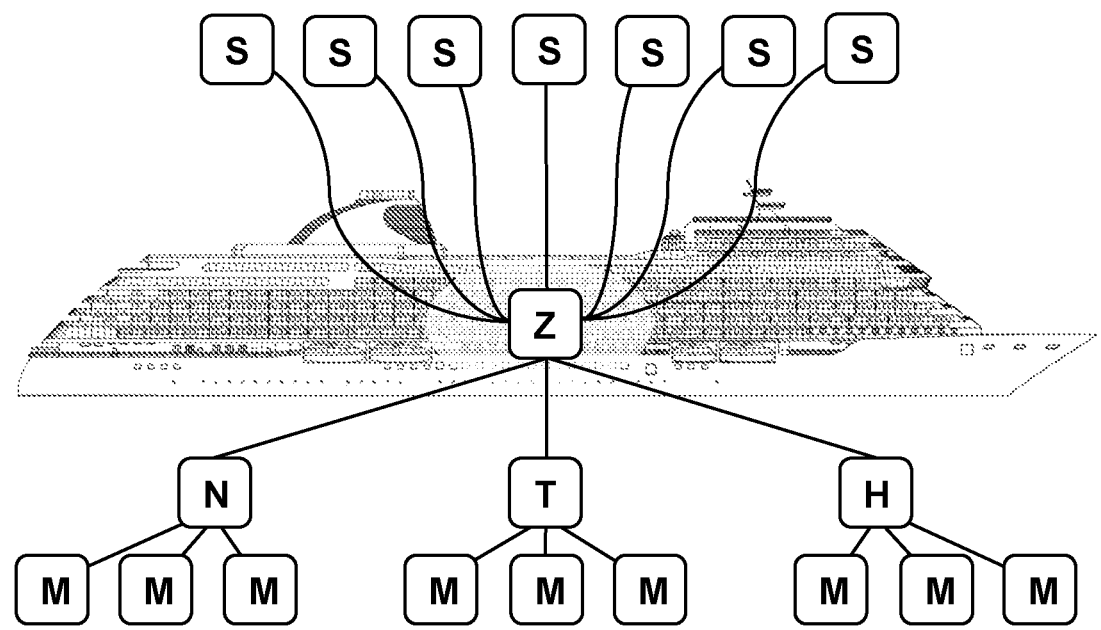

SYSTEM FOR MONITORING THE OPERATION OF A SHIP

CROSS-REFERENCE TO RELATED APPLICATIONS

This application represents the U.S. National Phase of International Application number PCT/DE2021/100565, entitled "System for Monitoring the Operation of a Ship", filed on Jul. 1, 2021, which claims benefit to German patent application 102020118303.8, filed Jul. 10, 2020, all of which are incorporated herein by reference.

BACKGROUND OF THE INVENTION

The invention relates to a system for monitoring the operation of a ship.

The monitoring of the operation of a ship is a highly complex task, the implementation of which requires a high outlay in terms of apparatus and above all a high personnel requirement.

Devices and methods which simplify the operation of a ship by means of automatic processes are known, for example, from US 2004/0 243 859 A1, DE 196 36 853 A1, DE 44 23 233 A1, also using the IEEE Std 802.3bt-2018 standard.

At present, the problem lies in a combination of a very large number of up to 2,500 sensors per ship and the fact that the performance of both the data network and the people is no longer a given, and the resulting problem of sufficiently accurately and promptly detecting, processing, and evaluating the abundance of data and events. As a result, current events are overlooked or identified too late. It is also not possible, in the known solutions, to singularize and evaluate events, and to store the mass of the data sufficiently accurately.

This circumstance leads to a missed or very highly delayed discovery of a critical situation, with nevertheless high personnel effort, or, at a later point in time, even a failure to identify critical data. Specifically, the later the discovery is made, the more likely it is that an event is overlooked, and the danger for humans or the ship becomes very great and ultimately can no longer be avoided.

The same applies to commercial opportunities, which are recognized too late or not at all, and then cannot be used to the commercial advantage of the ship operator.

Although manual recognition and reporting of events is always possible, an efficient possibility for the prompt combination of events and data and their distribution and forwarding, in order to respond adequately to the event, is often lacking.

Thus, there is currently in principle the problem of the prompt discovery of an event requiring an action, associated with the forwarding to a central location, viz., the ship command, which can carry out a hazard assessment and derive acts therefrom. In particular, the information available to the ship command is currently based almost exclusively upon the direct observation of events by different persons or on the indirect observation of events via the screens in the monitoring center by the on-board ship personnel, such that the subjective perception of these persons or personnel can lead to incorrect estimates with regard to necessary measures.

SUMMARY OF THE INVENTION

An object of the invention is therefore that of providing a system for monitoring the operation of a ship—in particular, with respect to persons located on-board the ship—which enables rapid action that is based upon and adequate for the situation.

Thus, according to the invention, a system for monitoring the operation of a ship is proposed, which system has a plurality of sensors configured to monitor devices of the ship and/or persons and objects located on-board the ship; a central computer connected to the sensors so as to communicate; and a plurality of reporting units connected to the central computer so as to communicate, wherein the reporting units are combined in a plurality of reporting groups which correspond to organizational units for operational and nautical command of the ship, and the central computer is configured to notify a reporting unit, assigned to a predetermined reporting group, as a function of an event detected by at least one sensor, wherein at least one of the sensors is a video camera, a lidar system, and/or a radar system, and at least one of the sensors or the central computer is designed for detecting faces, gestures, and/or facial expressions, and the detected event is a face, a gesture, and/or a facial expression.

The advantage of the invention is that each event detected by a sensor is communicated to a central computer which, as a function of the event, transmits a message to an organizational unit, specialized with respect to the event. Before the transmission, the event can be checked for plausibility and categorized with respect to its priority by the central computer, so that the organizational unit can take care of simultaneously occurring events in the order of the urgency of the events. As a result of this measure, fewer assessment errors occur, wherein it is ensured, at the same time, that, by virtue of the fact that only the personnel qualified with respect to the event take care of the event, adequate measures are initiated quickly, and resources are conserved.

The sensors of the system are preferably arranged on and in the ship.

According to the invention, the sensors and/or the central computers are configured such that at least one of the sensors or the central computer serves to evaluate the events detected by the sensors. If the sensors themselves have a logic for evaluating the events detected by the sensors, the computing capacity of the central computer can be preserved, and, therefore, time otherwise elapsing until the evaluation by the central computer, which has to evaluate an abundance of data, and reporting to the reporting units, is also avoided.

It is especially advantageous to equip the system with a device for locating the reporting units, wherein the central computer is configured to notify that reporting unit of the predetermined reporting group which is closest to the sensor detecting the event. As a result, it can be ensured that the personnel operating the reporting unit can immediately attend to the event which has occurred in the vicinity of the reporting unit.

For redundancy of the system, it is further preferably provided that the central computer be configured to notify at least two of the reporting units, assigned to the predetermined reporting group, as a function of an event detected by at least one sensor.

In order to further improve the safety of the system, it is preferably provided that the central computer be configured to notify a reporting unit of another reporting group, after a predetermined time has elapsed, in the event that no acknowledgment has been sent to the central computer by at least one reporting unit following notification of the reporting unit.

The central computer can consist of a plurality of components and preferably has a plurality of servers. For example, if the sensors are video cameras, the central computer consists in particular of a video server and an event server that processes the video signals.

Finally, it is preferably provided that at least one of the reporting units be a radio or a mobile telephone.

Finally, a ship—in particular, a cruise ship or a ferry having the system described above—is also proposed. Particularly preferably, the cruise ship has organizational units divided into nautical ship command, technical management, and hotel operation.

The solution according to the invention is based in particular upon a complete monitoring of the public and non-private deck outside and deck inside areas of the ship, including all steps and staircases.

In this case, cameras in the visual, infrared, and thermal spectra, in addition to local radar sensors and, if applicable, also lidar sensors are, at least in part, used. The data of the sensors are preferably processed decentrally. Object recognition, pattern recognition for the event identification, and classification take place. Further preferably, key words are generated on the basis of features and connected to the primary sensor data. Primary and secondary data are preferably temporarily stored in a decentralized manner, and, at the same time, reduced primary and all secondary data are forwarded via the network to the video server and the event server. A prioritization, evaluation, and linking of events to the message are preferably carried out, wherein the events particularly preferably are divided over the three departments, "nautical ship command," "technical ship command," and "hotel area management," of a cruise ship.

In the central event server that is particularly preferably provided, separate further messages can be sent to the personal devices, according to predefined rules, from the individual messages relating to the departments.

Thus, thermal videography, daylight videography, infrared videography, radar recognition, integrated video analysis within the sensor, sensors, analysis and predefined and learned intelligence, interface management accommodated in a common housing, preferred interfaces Power over Ethernet can be provided as the single interface of the cameras to the outside. The data are recorded within the framework of the legal requirements, wherein targeted or general relaying of events to remote personal devices takes place.

The sensor system is generally based upon three to four sensors: thermal videography, visual videography, short distance radar sensors for detecting persons present in small rooms or spatial regions, and possibly lidar sensors.

The connection to the IT infrastructure is preferably designed simply, in that only one single Ethernet connection is provided as an interface to the outside. This Ethernet connection is in particular designed according to a standard—for example, the IEEE 802.3bt standard. This is the preferred specification for Power over Ethernet (PoE) with maximum energy transmission on the Ethernet itself in order to supply the various sensors with energy.

In these special embodiments, the customer requires an IT infrastructure which is designed according to the IEEE 802.3bt standard, for example. Additional measures may be required if high-quality external videos to be sold are to be added to the standard videos.

A further preferred property of the sensors is that the video analysis takes place on different patterns within the sensors themselves. For the IT infrastructure, this means that it is not necessary to ensure high data streams on the separate Ethernet of the ship, on which these sensors are connected (as is otherwise known from video transmissions).

With the proposed solution, preferably only reduced data in a continuous video data stream in HD resolution are transmitted to the video server. Only in the case of an event is a full HD video stream transmitted, which transmits an HD video from time X (configurable time in seconds before the event) to an adjustable time V (configurable time in seconds after the event) of the video sensor. This procedure prevents a continuous, large data stream of video data through the network to a central recording computer. The network structure of the customer can thus be designed to be less complex, the video memory is less burdened, and the system retains its stability even in the case of simultaneous events.

Since the camera data are preferably tagged, a search for these keywords can be performed in the video material of all cameras, backwards and forwards in terms of time. This affords significant possibilities for understanding and examining pre- and post-courses of events. It leads to considerable personnel savings in the area of personnel operating the system.

The events detected by the sensors may be of the following preferred forms:

Attacks on Persons by Means of Hitting or Stabbing

The camera system automatically detects unwanted or prohibited movements of persons. This includes, for example, instances of physical violence by hitting or stabbing other passengers. In particular, hitting by hand.

Assaults on Persons by Inappropriate Touching or Groping

The camera system automatically detects unwanted or prohibited movements of persons. This includes, for example, instances of sexual harassment of other passengers. In particular, inappropriate touching or what is referred to as groping is to be mentioned here.

Unusual Movements, e.g., People Falling on Steps or Staircases

The camera system automatically detects undesired movements of persons. This includes, for example, people falling on steps or staircases.

Unusual Movements, e.g., People Falling in Public Areas

The camera system automatically detects undesired movements of persons. This includes, for example, people falling in public areas. Small people (=children) can be excluded.

Persons in Wheelchairs or with Rollators on Steps/Staircases

The camera system automatically detects wheelchairs (occupied by persons) and persons with rollators on steps and in hazardous areas.

Individual Persons with Strollers or Pushchairs on Steps/Staircases

The camera system automatically detects individual persons with a stroller or pushchair on staircases and in hazardous areas.

Individuals in Barred Areas (Also, in this Case, People Climbing)

The camera system automatically detects climbing or crawling in barred, defined areas (e.g., in the area of the lifeboats, on projections, or decorative structures).

Persons Lying on the Floor or Persons Sleeping in the Public Area

The camera system automatically detects individual persons lying in the public area (floors, benches, deckchairs at certain times).

Personalized Travel Videos

With the help of the camera system, it is possible to create personalized videos for travelers that reflect particular moments of the trip. This may, for example, be a dinner with the captain, or a marriage proposal, or a moment on the ship's deck when entering or leaving the harbor, or traveling past sights of interest (e.g., the Golden Gate Bridge). On account of defined personal features that relate to the external appearance of the passenger, these videos are to be created in a personalized manner. In this case, scenes of recorded videos, showing the passengers in corresponding situations, are retrospectively assembled. This results in the possibility of commercial business for the ship's operator.

Detection of a Defined Number of Persons or Objects

The camera system automatically detects and counts objects and persons in a defined area. If a certain value, e.g., X number of persons or objects, is reached, an alarm is triggered and displayed at a central location in the ship. A number of 0 is also permissible here. By means of this information, the maximum or minimum permissible number of persons and or objects for a room or area, for example, can be automatically recognized, or commercial processes, e.g., in restaurants and shops, can be controlled.

Individuals with Abnormal Body Temperatures (Infections)

The camera system identifies individual persons in the public area who have unusually high body temperatures, and these are automatically detected. It is thus possible to prevent unwell persons from spending time in the restaurant, for example.

Thefts

The camera system automatically detects individual persons in certain public areas who are reaching illicitly into tills, taking things from shops without paying, or stealing things from other persons.

Age-Differentiated Access Control

The camera system and its person recognition automatically perform age-differentiated access controls on the ship on the basis of specific features. Regions to which only adults have access, such as casinos or where a certain minimum age is necessary for access, e.g., the fitness or wellness areas, cinemas, events, shops selling alcohol and tobacco, or restaurant areas, are monitored automatically, and an alarm is generated in the case of an event and, for example, displayed in the security center of the ship.

Identification of Intruders from Outside of the Ship

The camera system automatically identifies, as intruders, persons and objects entering the ship from the outside, on defined zones, and reports these to a central location—for example, the ship's bridge. The corresponding camera image is automatically displayed to the navigator on watch on the bridge. Said person can assess the situation and initiate the countermeasures in a targeted manner. An entry is made automatically into an electronic log. A corresponding video is archived.

Identification of People Climbing in the Outside Area

The camera system automatically identifies persons who, in the outside area, are climbing on projections and projecting objects, or are moving. The areas not to be climbed on can be defined per camera, and the persons are automatically recognized as danger and reported to the corresponding organizational structure. The corresponding camera image is automatically displayed to, for example, the navigator on watch on the bridge. Said person can assess the situation and initiate the countermeasures in a targeted manner. An entry is made automatically into an electronic log. A video is archived.

Preventive Detection of Potential Suicide Risk

The pattern recognition of the camera intelligence recognizes indecisive pacing back and forth by a person as a conspicuous pattern and will thereupon activate a height limit (climbing over the railing) in the camera, which triggers an alarm in the camera system when this limit is violated. The corresponding camera image is automatically displayed to the navigator on watch on the bridge. This alarm and additional information are provided to the electronic logbook for documentation. A video can be archived if necessary.

Since the function on a passenger ship could easily lead to false alarms during normal daily travel operation, the function is only activated when less than a selectable number of people are present in the monitored region (e.g., <=2) or only during a determinable time frame (e.g., 24:00-5:00) in which, from experience, such situations could result.

Initial Fire Control Support

If the camera system is connected to the fire alarm system of the ship by means of an interface, the camera(s) closest to the location is (are) automatically displayed to the watchman on the bridge when a fire alarm is triggered. Any person in the public area can be detected in the corresponding area. This serves for finding persons, as well as monitoring the firefighting measures. If desired, video archiving starts automatically with this action. Said watchman can assess the situation and initiate the countermeasures in a targeted manner. An entry is made automatically into an electronic log.

Persons on the Barred Car Deck of a Ferry and Other Barred Regions

The camera system automatically detects persons in barred, defined regions (for example, in the region of the car deck(s) and in the deck outside region in the case of a storm).

Panic Situation

The camera system automatically detects gatherings of people (even without identifiable triggering) in defined public regions (e.g., in the deck outside region or in other deck inside regions), e.g., due to panic or riotous behavior.

Detection of Smoke or Fog in the Interior

The camera system automatically detects smoke and fog in the inner deck region.

Failure/Loss of Lighting

The camera system automatically detects the failure of individual lamps in the public area.

Blocking of Swing Ranges of Doors and Bulkhead Partitions

The placement of objects or the presence of persons in the swing ranges of doors and bulkhead partitions can result in hazardous situations which cannot be recognized automatically with existing means. These situations can be detected and displayed.

Detection of Smoking, High Heat, or Open Fire in Critical Areas

The use of thermal cameras can detect and display smoking, high heat, or open fire in critical areas (car deck, engine room, but also kitchen).

The prioritization of an event and the message to a preferred reporting group are summarized by way of example according to a particularly preferred embodiment in the following table:

| Event | Prioritization Classification | | | Configurable escalation stages | |
|---|---|---|---|---|---|
| | Category | Priority | Message | Addressee | Escalation |
| hitting or stabbing | location-dependent | high | alarm | hotel operation | nautical ship command |
| sexual harassment | location-dependent | high | alarm | hotel operation | nautical ship command |
| falling | location-dependent | medium | information | hotel operation | nautical ship command |
| rollator or wheelchair on steps | location-dependent | high | warning | hotel operation | nautical ship command |
| unauthorized entry | time-dependent | high | alarm | technical ship command | nautical ship command |
| unconsciousness | location-dependent | high | warning | hotel operation | nautical ship command |
| lying persons | time-dependent | low | warning | hotel operation | nautical ship command |
| high body temperature | time-dependent | medium | warning | hotel operation | nautical ship command |
| theft | location-dependent | low | warning | hotel operation | nautical ship command |
| access control | location-dependent | medium | alarm | technical ship command | nautical ship command |
| unauthorized intrusion | location-dependent | high | alarm | technical ship command | nautical ship command |
| risk of suicide | time-dependent | high | alarm | hotel operation | nautical ship command |
| fire control | location-dependent | high | information | nautical ship command | technical ship command |
| smoke/fog in the interior | location-dependent | high | warning | nautical ship command | technical ship command |
| gatherings | time-dependent | low | information | hotel operation | technical ship command |
| gatherings | location-dependent | medium | warning | hotel operation | nautical ship command |
| lighting failure | time-dependent | low | information | technical ship command | hotel operation |
| blocking of swing ranges | location-dependent | medium | alarm | technical ship command | nautical ship command |
| smoking, heat, or open fire | location-dependent | medium | alarm | technical ship command | hotel operation |

BRIEF DESCRIPTION OF THE DRAWINGS

FIG. 1 shows the schematic structure of a system for monitoring the operation of a ship.

DETAILED DESCRIPTION OF THE PREFERRED EMBODIMENTS

In the following, the invention will be described in more detail with reference to an embodiment of a particularly preferred design, shown in the accompanying drawings.

FIG. 1 shows the schematic structure of a system having a particularly preferred design for monitoring the operation of a ship, on the basis of a cruise ship.

For its regular operation, the cruise ship has organizational units in the form of the nautical ship command, the technical management, and a hotel operation.

In the example shown, the system for monitoring the operation of a ship has a plurality of sensors S arranged on the deck and under the deck, which sensors are configured to monitor devices of the ship and/or persons located on-board the ship. The sensors S are in particular designed as a video camera, lidar, and/or radar system and are each connected to a central computer Z so as to communicate, wherein the central computer Z in turn is connected to a plurality of reporting units M.

The sensors S or the central computer Z are designed to evaluate the events detected by the sensors S and, in particular, are designed for detection of faces, gestures, and/or facial expressions.

The reporting units M—in particular, radios or mobile telephones—are combined in a plurality of reporting groups N, T, H, which correspond to the organizational units for operational and nautical command of the ship, viz., nautical ship command, technical management, and hotel operation.

The central computer Z, which can consist of a plurality of servers, is configured to notify at least one reporting unit M of a predetermined reporting group N, T, H as a function of an event detected by at least one sensor S. Thus, in the case of an event indicating a risk of suicide, for example, a reporting unit of the hotel operation H is notified, whereas, in the event of a failure of the lighting, the technical ship command is notified, and, when an event indicating a fire is reported, the nautical ship command is notified.

Specifically, the system is equipped with the aid of a device for locating the reporting units M, wherein the central computer Z is configured to notify that reporting unit M of the predetermined reporting group N, T, H which is closest to the sensor S detecting the event, such that only a very short time elapses between the reporting of the event and the measure immediately to be taken.

If an acknowledgment of the message by the reporting unit M is absent, the central computer Z will, after a predetermined time has elapsed, perform the notification of a reporting unit M of another reporting group N, T, H, which preferably corresponds to the next highest hierarchical level of the corresponding organizational structure, so that the event can be adequately handled.

The invention claimed is:

1. A system for monitoring operation of a ship, comprising:
   a plurality of sensors configured to monitor devices of the ship and/or persons and objects located on-board the ship,
   a central computer connected to the sensors so as to communicate with the sensors, and
   a plurality of reporting units connected to the central computer so as to communicate with the central computer, wherein
   the reporting units are combined in a plurality of reporting groups which correspond to organizational units for operational and nautical command of the ship, and
   the central computer is configured to notify a reporting unit, assigned to a predetermined reporting group, as a function of an event detected by at least one sensor, to check the event for plausibility and to categorize the event with respect to priority, and is further configured to notify the reporting unit based on the plausibility and the priority of the event, and
   at least one of the sensors is a video camera, a lidar system, and/or a radar system, wherein at least one of the sensors or the central computer is configured for detecting faces, gestures, and/or facial expressions, and the detected event is a face, a gesture, and/or a facial expression.

2. The system according to claim 1, wherein the sensors are arranged on and in the ship.

3. The system according to claim 1, further comprising a device for locating the reporting units, wherein the central computer is configured to notify that reporting unit of the predetermined reporting group which is closest to the sensor detecting the event.

4. The system according to claim 1, wherein the central computer is configured to notify at least two of the reporting units, assigned to the predetermined reporting group, as a function of an event detected by at least one sensor.

5. The system according to claim 1, wherein the central computer is configured to notify a reporting unit of another reporting group, after a predetermined time has elapsed, in the event of no acknowledgment having been sent to the central computer by at least one reporting unit following notification of the reporting unit.

6. The system according to claim 1, wherein the central computer has a plurality of servers.

7. The system according to claim 1, wherein at least one of the reporting units is a radio or a mobile telephone.

8. A ship having a system according to claim 1.

9. The ship according to claim 8, wherein the ship is a cruise ship or a ferry.

10. The ship according to claim 8, further comprising organizational units divided into nautical ship command, technical management, and hotel operation.

11. The system according to claim 1, wherein the central computer is configured to automatically notify the reporting units, assigned to the predetermined reporting group, whereby only personnel qualified with regard to the event, deal with the event.

* * * * *